(12) United States Patent
Koc

(10) Patent No.: US 11,664,745 B2
(45) Date of Patent: May 30, 2023

(54) ULTRASONIC ACTUATOR FOR A ROTARY DRIVE

(71) Applicant: PHYSIK INSTRUMENTE (PI) GMBH & CO. KG, Karlsruhe (DE)

(72) Inventor: Burhanettin Koc, Ettlingen (DE)

(73) Assignee: PHYSIK INSTRUMENTE (PI) GMBH & CO. KG, Karlsruhe (DE)

( * ) Notice: Subject to any disclaimer, the term of this patent is extended or adjusted under 35 U.S.C. 154(b) by 184 days.

(21) Appl. No.: 17/272,323

(22) PCT Filed: Aug. 29, 2019

(86) PCT No.: PCT/DE2019/100781
§ 371 (c)(1),
(2) Date: Feb. 28, 2021

(87) PCT Pub. No.: WO2020/043242
PCT Pub. Date: Mar. 5, 2020

(65) Prior Publication Data
US 2021/0226559 A1    Jul. 22, 2021

(30) Foreign Application Priority Data
Aug. 30, 2018  (DE) ..................... 10 2018 121 179.1

(51) Int. Cl.
*H02N 2/00*    (2006.01)
(52) U.S. Cl.
CPC ........... *H02N 2/002* (2013.01); *H02N 2/0055* (2013.01); *H02N 2/0065* (2013.01); *H02N 2/0075* (2013.01)
(58) Field of Classification Search
CPC .... H02N 2/002; H02N 2/0055; H02N 2/0065; H02N 2/0075; H02N 2/103; H02N 2/12
See application file for complete search history.

(56) References Cited

U.S. PATENT DOCUMENTS 8,344,592 B2 *   1/2013   Wischnewskiy ..... H02N 2/0065
                                              310/323.02

FOREIGN PATENT DOCUMENTS

DE   102012201863 B3   5/2013
DE   102013224569 B3   6/2014
(Continued)

OTHER PUBLICATIONS

English Abstract for DE102013224569 retrieved on Espacenet on May 5, 2022.
(Continued)

*Primary Examiner* — Emily P Pham
(74) *Attorney, Agent, or Firm* — The Juhasz Law Firm

(57) ABSTRACT

The invention relates to an annular or hollow cylindrical ultrasonic actuator, on the end faces of which are arranged n≥2 friction elements, and on the outer peripheral surface of which are arranged 2n excitation electrodes, spaced apart from one another in each case by a separating gap, each of the friction elements being arranged in the region of a separating gap, wherein, between friction elements that are adjacent with respect to the periphery of the ultrasonic actuator and are located on different end faces, two excitation electrodes are arranged such that, when the ultrasonic actuator is electrically excited, the friction elements of both end faces simultaneously perform a movement which is suitable for driving an element to be driven to rotate in the same direction. The invention further relates to an ultrasonic motor having an ultrasonic actuator of this kind and having a holding device in which the ultrasonic actuator is inserted.

11 Claims, 8 Drawing Sheets

(56) References Cited

FOREIGN PATENT DOCUMENTS

Figure 1:
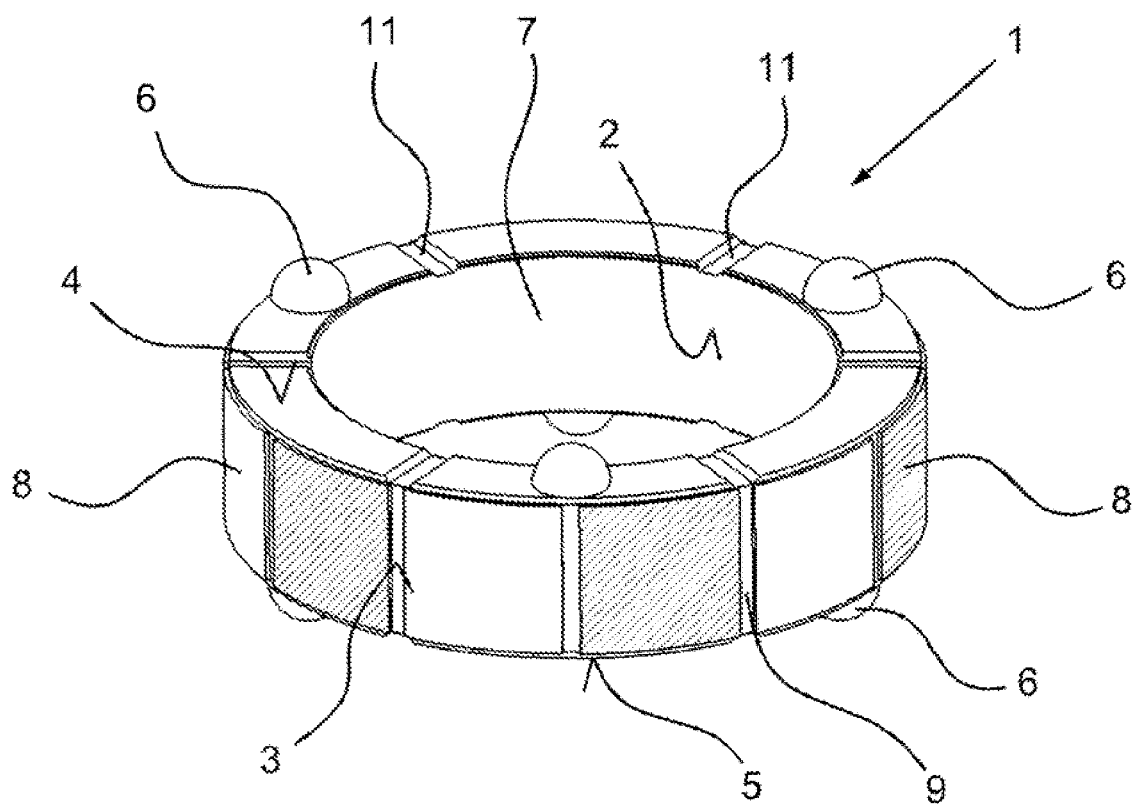

| | | |
|---|---|---|
| DE | 102017114667 B3 | 11/2018 |
| EP | 2845305 B1 | 10/2015 |
| WO | 2004/064170 A2 | 7/2004 |
| WO | 2014183761 A1 | 11/2014 |

OTHER PUBLICATIONS

English Abstract for DE102017114667 retrieved on Espacenet on May 5, 2022.
English Abstract for DE102012201863 retrieved on Espacenet on May 5, 2022.

* cited by examiner

ULTRASONIC ACTUATOR FOR A ROTARY DRIVE

The invention relates to an ultrasonic actuator according to claims 1 to 8 and an ultrasonic motor with such an ultrasonic actuator and a holding device which holds the ultrasonic actuator according to claims 9 and 10.

DE 10 2013 224 569 B3 discloses a hollow cylindrical ultrasonic actuator, in which friction elements are disposed on its upper and lower end face in such a way that they are not opposite one another, but are disposed offset from one another by a certain peripheral angle. In case that an electrical voltage is applied, movement of the friction elements which are disposed on the peripheral surfaces of the hollow cylinder is possible independently from one another, so that two elements to be driven by the ultrasonic actuator which are in contact with the respective friction elements can be moved independently of one another.

DE 10 2017 114 667 B3 teaches a hollow cylindrical ultrasonic actuator in which friction elements which are disposed on the upper and lower end faces are disposed opposite each other.

From EP 2 845 305 B1 an ultrasonic actuator in the form of a hollow cylinder is known in which friction elements are disposed either on one of its end faces or however on both end faces. In the case of the presence of friction elements located on both end faces on each end face the same number of friction elements is provided, wherein the positions of the friction elements of one end face, related to the circumference, match with the positions of the friction elements of the other end face related to the circumference, so that two friction elements are disposed opposite to one another on the different end faces.

With friction elements disposed on both end faces it is possible to use the same simultaneously to drive an element to be driven. For this purpose, the friction elements of the respective end face are in contact with an associated friction part, which in turn is connected to a shaft to be driven. In order to transmit a sufficient driving force from the friction elements to an associated friction part, the friction parts are pressed against the friction elements of the respective end face.

However, it is disadvantageous here that the compressive forces which act on the ultrasonic actuator via the friction elements from both sides dampen the deformations which are caused in the ultrasonic actuator by electrical excitation, which results in a reduced drive power of a corresponding ultrasonic motor.

Another disadvantage of the ultrasonic actuator known from EP 2 845 305 B1 is the formation of a disadvantageous impedance spectrum, especially when using a higher number of friction elements. In other words, a higher number of friction elements disposed on the end faces causes the formation of a plurality of peaks in the impedance spectrum close to resonance frequency of the ultrasonic actuator, which have the effect that the vibrations or movements of the friction elements in the operating frequency are not synchronously, and that an undesirable noise results during operation of a corresponding ultrasonic motor.

It is therefore object of the invention to provide an ultrasonic actuator in the form of a ring or a hollow cylinder, which can generate a simultaneous or synchronous movement of the friction elements which are disposed on both end faces which is suitable for driving an element to be driven, wherein the movement is only slightly damped by external pressure forces which act on the friction elements or on the ultrasonic actuator acting, wherein the ultrasonic actuator comprises an impedance spectrum which is advantageous in particular with a larger number of friction elements which are disposed on the ultrasonic actuator, so that during operation of the ultrasonic actuator in a corresponding ultrasonic motor no undesirable noise occurs.

This object is solved by an ultrasonic actuator according to claim 1, wherein the subsequent subclaims describe at least useful developments.

The term 'essentially' which is occasionally used in the following part of the description in connection with the specification of geometric data such as angles, dimensions, positions, orientations or directions is to be understood such that the corresponding geometric data may include a deviation of +/−5% in relation to the respective specified geometric data, whereby this deviation is due, for example, to manufacturing or assembly tolerances.

The ultrasonic actuator according to the invention is made of one electromechanical material and preferably made of a piezoelectric material such as piezoceramic (for example PZT). The ultrasonic actuator can also consist of an electrostrictive or a magnetostrictive material. The same has the shape of a ring or hollow cylinder with an inner peripheral surface which is oriented radially inwards and on which a single common electrode is disposed, and with an outer peripheral surface which is oriented radially outwards, wherein the inner peripheral surface and the outer peripheral surface are connected to each other via two end faces. At least one friction element, for example in the form of a hemisphere made of an oxide ceramic such as $Al_2O_3$, is disposed on each of the two end faces, so that on both end faces together at least $n \geq 2$ friction elements are disposed. Other geometric shapes of the friction elements are also conceivable.

There are $2n$ excitation electrodes disposed on the outer peripheral surface of the ultrasonic actuator, wherein adjacent excitation electrodes are each spaced apart by a separating gap and are thereby electrically isolated from one another.

By applying a suitable electrical voltage or by applying suitable electrical voltages to the electrodes of the ultrasonic actuator, the electromechanical material can be excited to form periodic deformations, which are transferred to the friction elements disposed on the ultrasonic actuator, wherein the corresponding movement paths of the friction elements are usable for driving one element to be driven or more elements to be driven which is or which are in contact with the friction elements.

In this case, each of the friction elements is disposed on the respective end face in the area of a separating gap, wherein between friction elements which are adjacently disposed with regard to the circumference of the ultrasonic actuator, however on different end faces, two excitation electrodes with a separating gap between them are disposed. These friction elements, which are respectively adjacent however are disposed on different end faces, form an opposing pair of friction elements.

When the ultrasonic actuator is electrically excited, i.e. when one or more electrical voltage/voltages are applied to the electrodes of the ultrasonic actuator, all of the friction elements disposed on the ultrasonic actuator, that is all of the friction elements disposed on one end face and all of the friction elements disposed on the other, opposite end face, perform a simultaneous or synchronous movement which is suitable for a rotational drive in the same direction of an element to be driven which is in contact with the friction elements. In other words, all friction elements oscillate in such a way that due to their oscillation tracks a driven element is driven along the same direction of rotation.

It can be an advantage that the distance between the two friction elements of an opposing pair which exists with regard to the scope of the ultrasonic actuator is identical for all opposing pairs, so that two opposing pairs of friction elements which are adjacent to each other are disposed symmetrically to one another.

It can also be advantageous that both end faces comprise a recess in the area of the separating gap between the two excitation electrodes of an opposing pair. It can be particularly advantageous here that the recesses are disposed distributed equally over the circumference of the ultrasonic actuator.

In addition, it can be advantageous that the recesses are groove-shaped and, in particular, comprise a substantially V-shape or U-shape in cross section.

Furthermore, it can be advantageous that the groove-shaped recesses comprise a radial orientation.

It can be advantageous for the excitation electrodes to comprise more than four corners and in particular an octagonal shape.

The invention also relates to an ultrasonic motor with an ultrasonic actuator described above and a holding device in which the ultrasonic actuator is inserted. This holding device comprises an inner contact element, an outer contact element and two holding elements.

The inner contact element and the outer contact element are connected to one another via the two holding elements, wherein the inner contact element via protrusion portions is in sections in contact with the inner peripheral surface of the ultrasonic actuator and the outer contact element via protrusion portions is in sections in contact with the outer peripheral surface of the ultrasonic actuator. Furthermore, the holding elements are in direct or indirect contact with the end faces of the ultrasonic actuator, wherein the same clamp the ultrasonic actuator between themselves.

Figure 2:
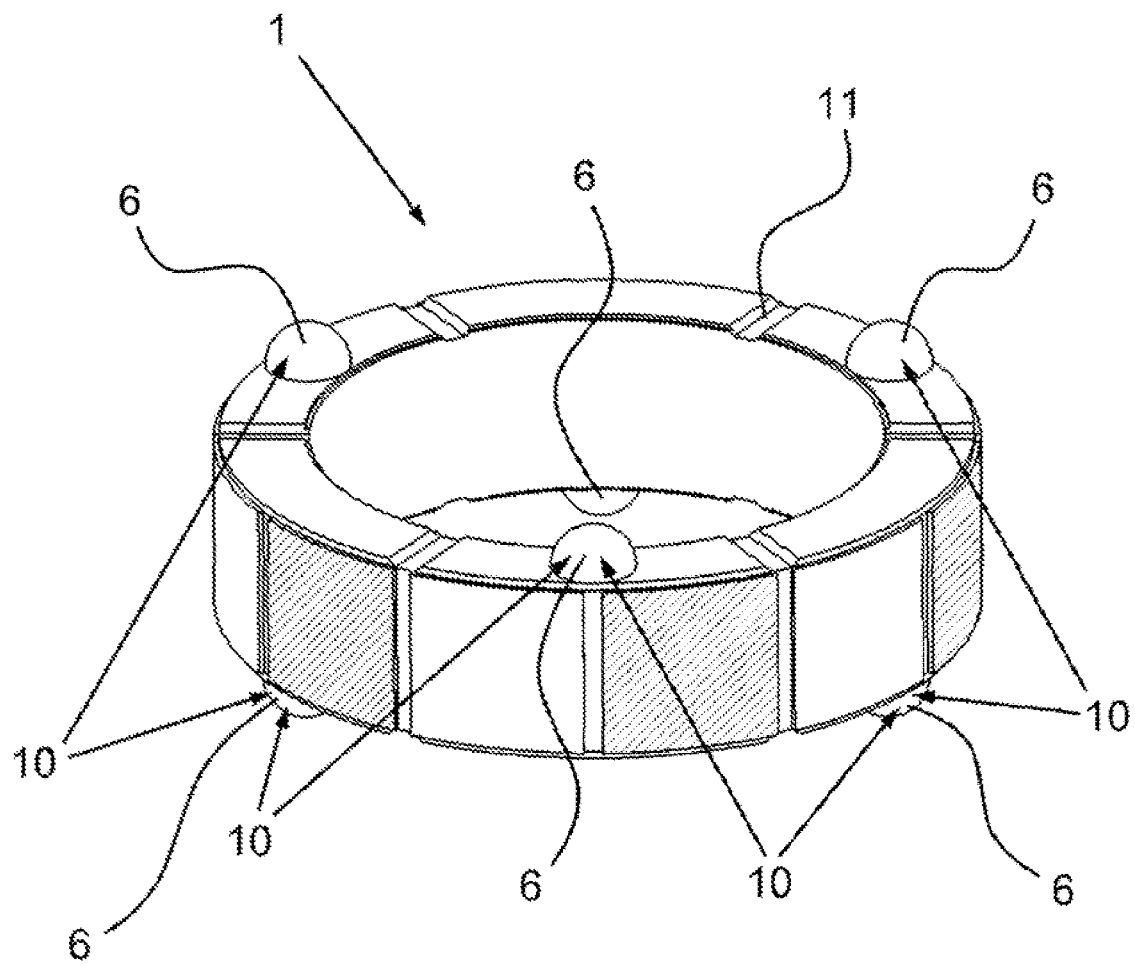
Figure 3A:
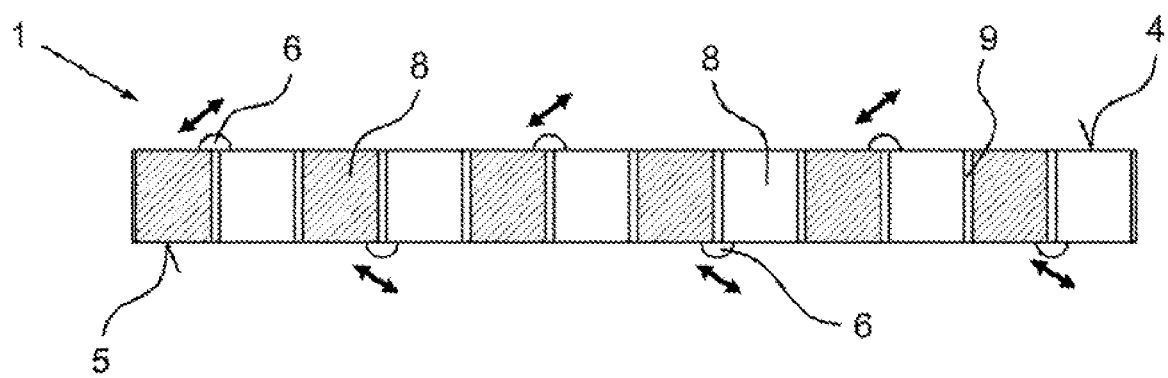
Figure 3B:
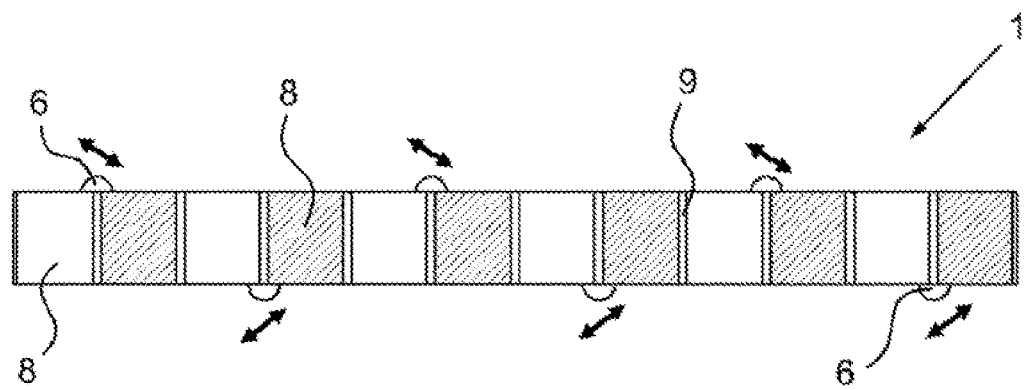
Figure 4A:
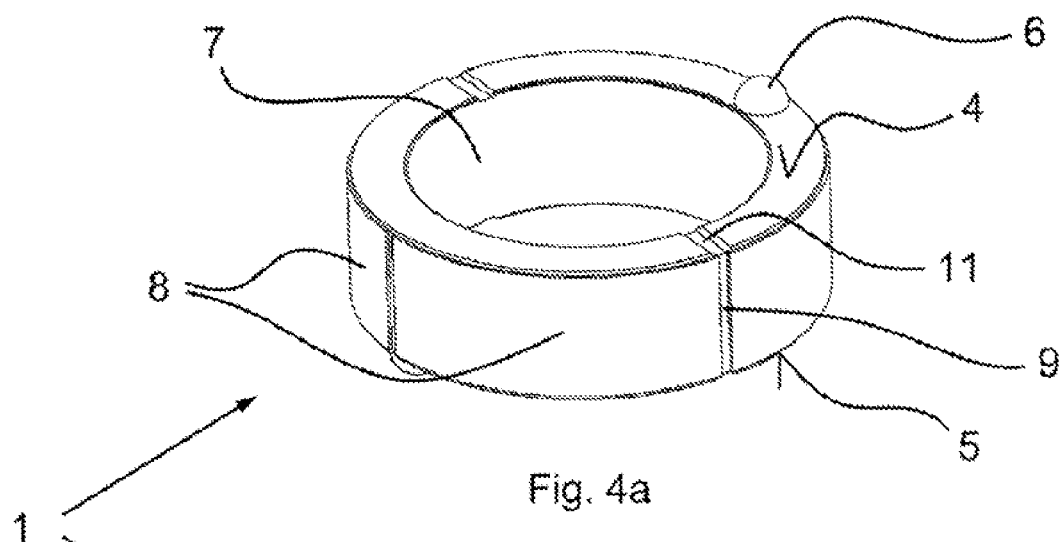
Figure 4B:
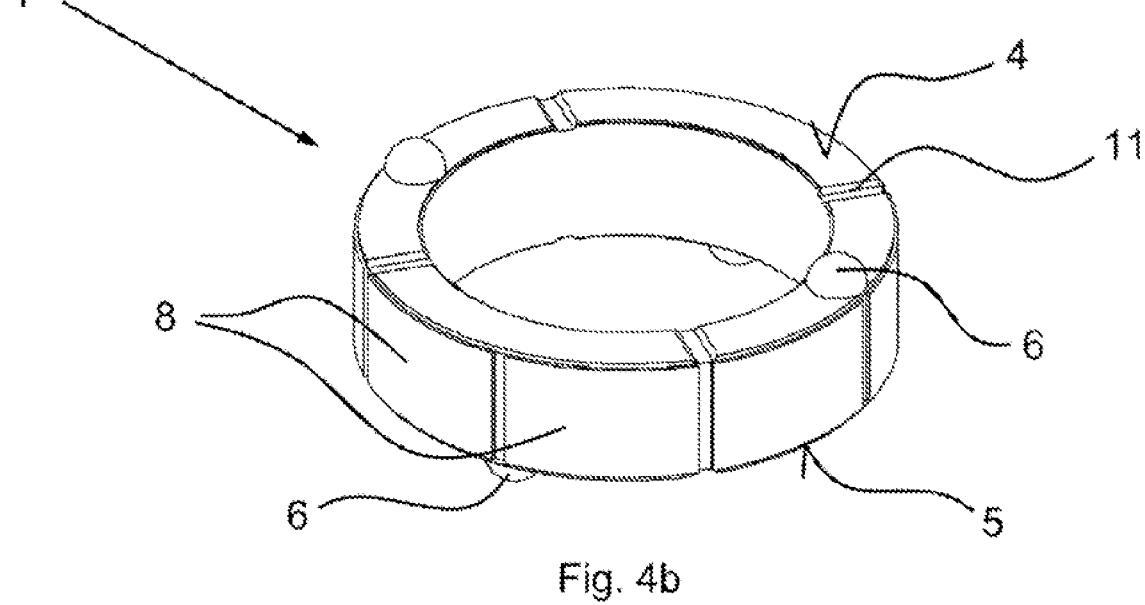
Figure 5:
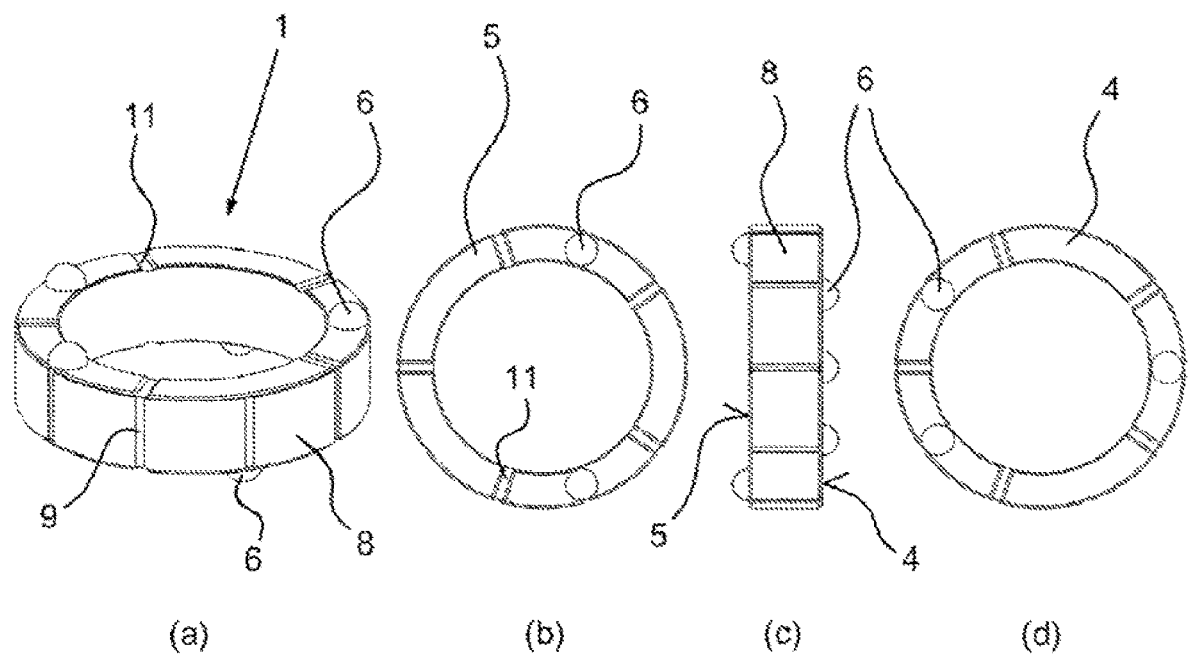
Figure 6:
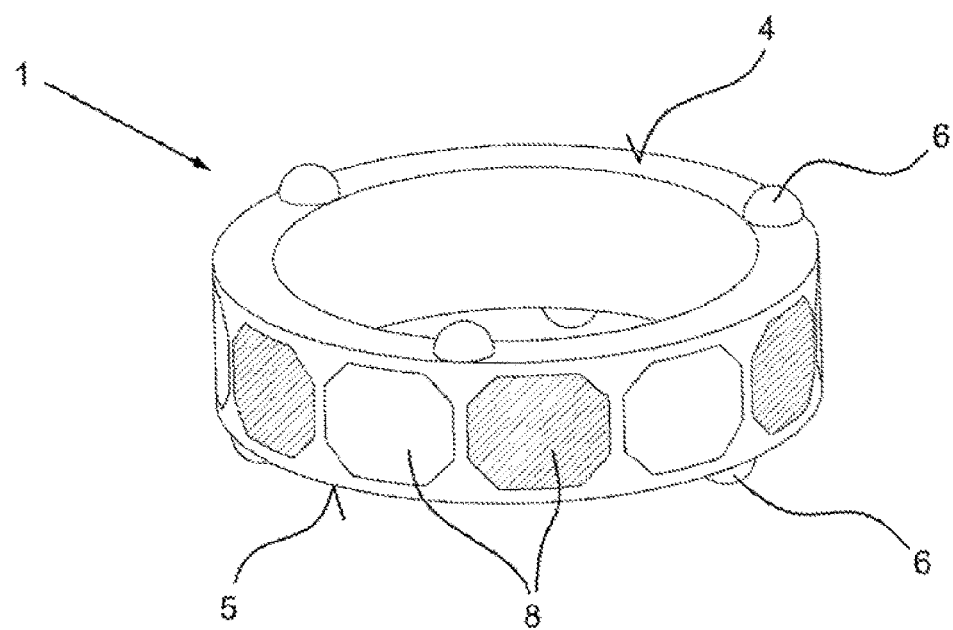
Figure 7:
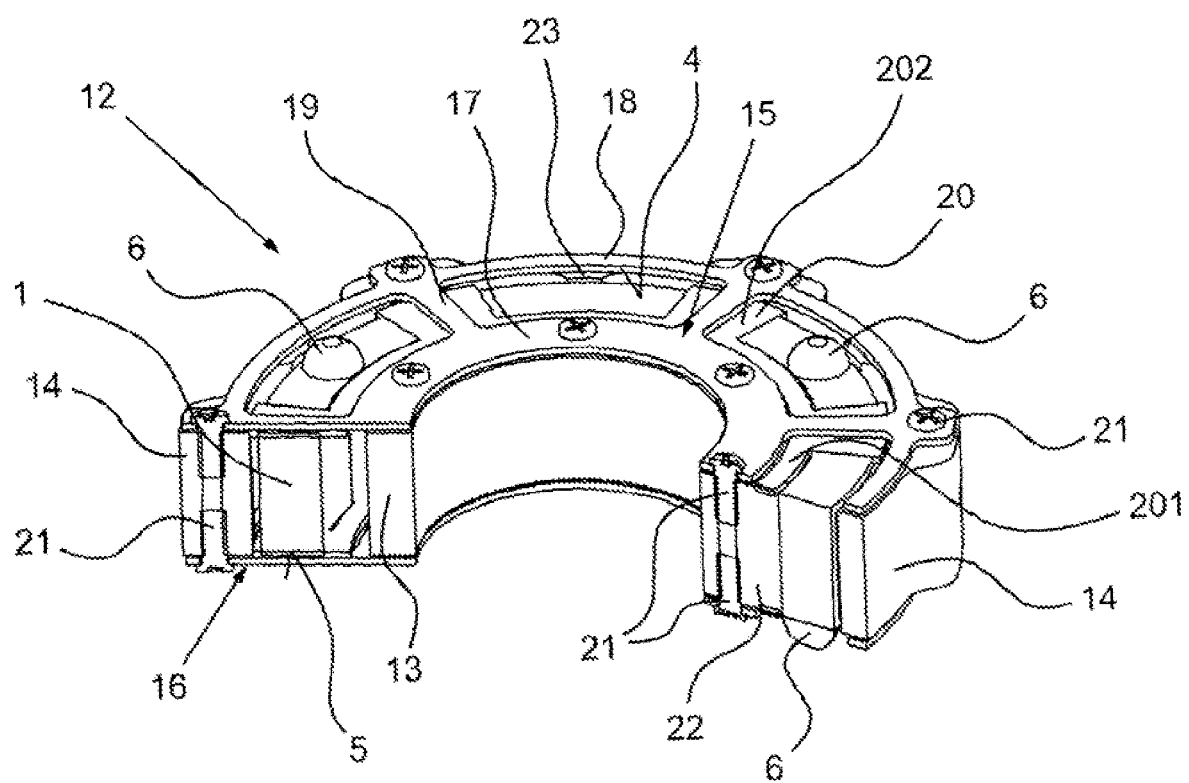
Figure 8:
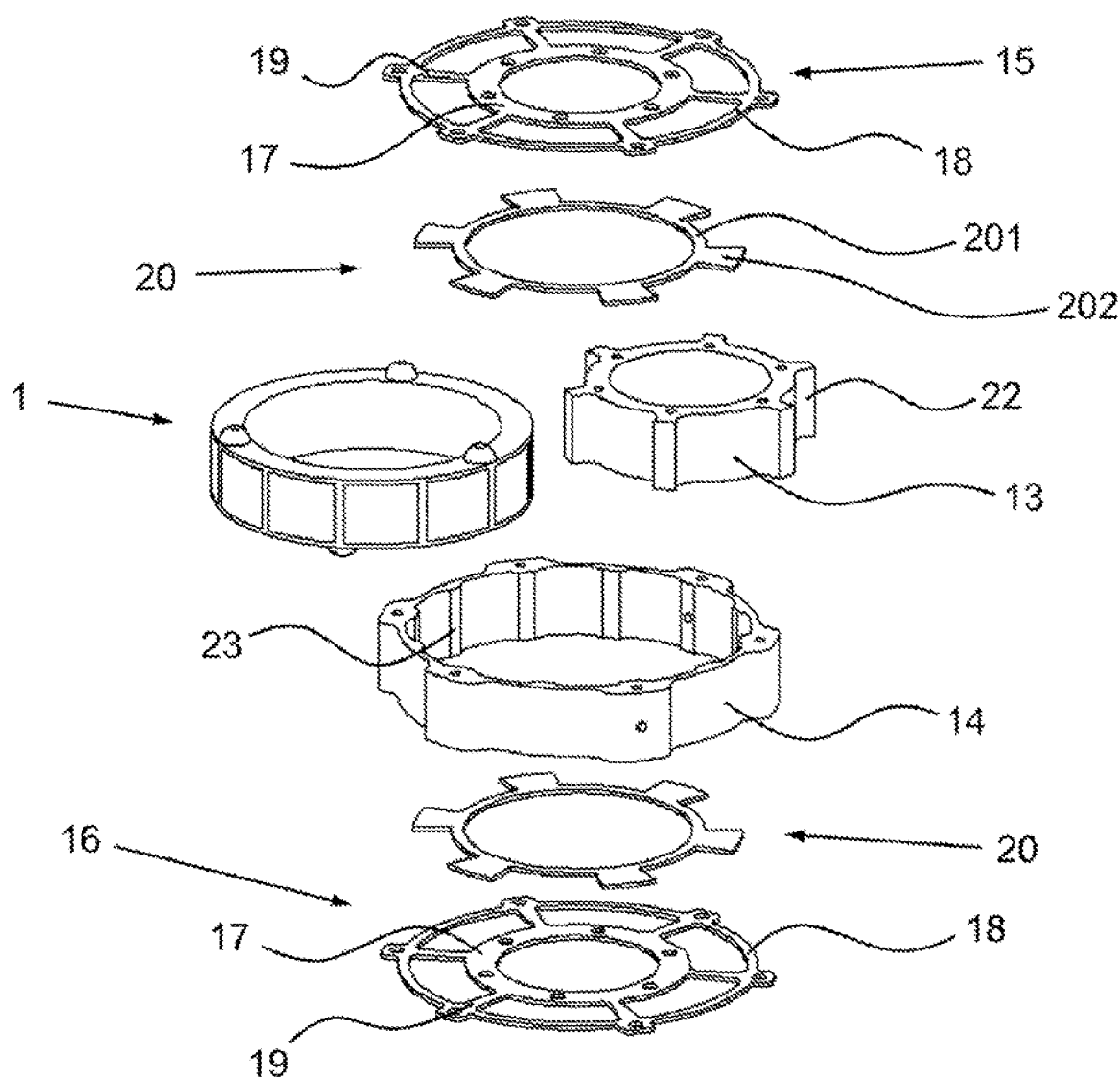
Figure 9:
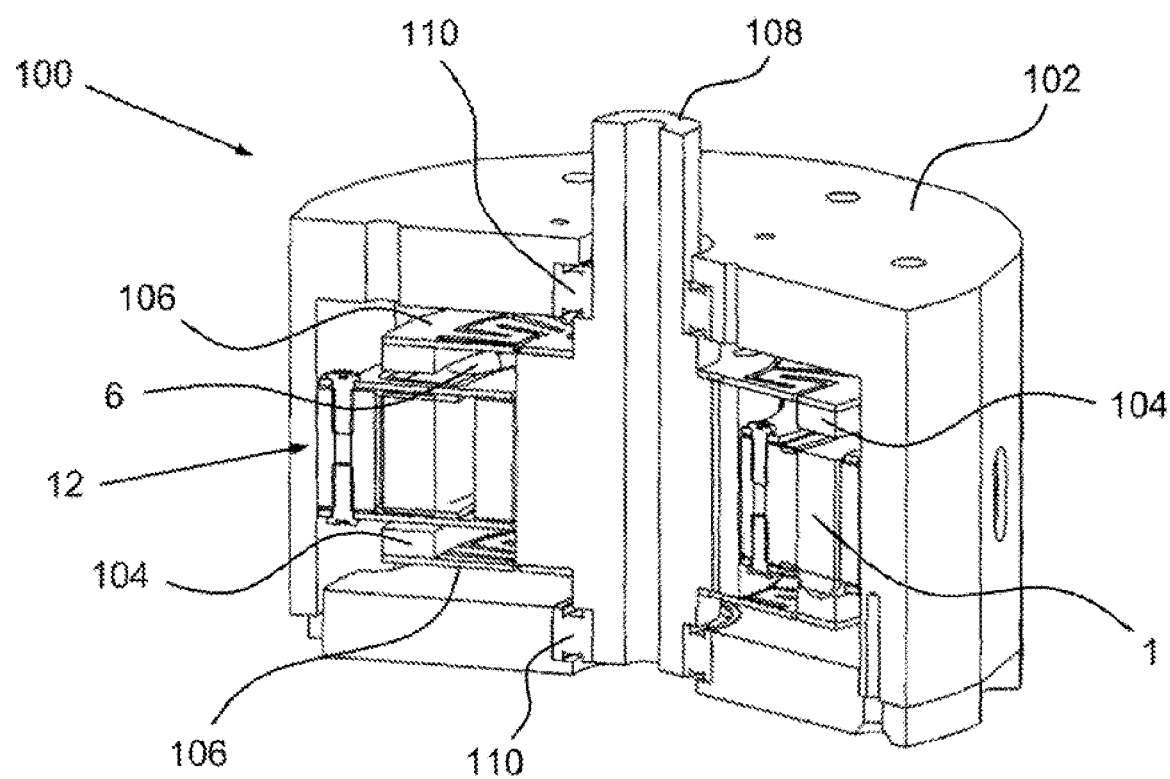

Advantages and functionalities of the invention will become clearer from the following description of preferred exemplary embodiments with reference to the figures. Here show:

FIGS. 1 and 2: an embodiment of the ultrasonic actuator according to the invention FIGS. 3a and 3b: ultrasonic actuator according to FIGS. 1 and 2 as flat pattern FIGS. 4a and 4b: two further embodiments of the ultrasonic actuator according to the invention FIGS. 5a to 5d: a further embodiment of the ultrasonic actuator according to the invention in different views FIG. 6: embodiment of the ultrasonic actuator according to the invention with octagonal excitation electrodes FIG. 7: holding device with an ultrasonic actuator mounted therein FIG. 8: holding device and ultrasonic actuator according to FIG. 7 in an exploded view FIG. 9: ultrasonic motor with an ultrasonic actuator according to the invention according to FIGS. 1 and 2 and a holding device according to FIG. 7 or FIG. 8

The ultrasonic actuator 1 according to the invention according to FIGS. 1 and 2 has a hollow cylindrical shape, wherein a single common electrode 7 is disposed on the facing inner peripheral surface 2 which faces radially inwards, wherein the common electrode 7 almost completely covers the inner peripheral surface 2. On the outer peripheral surface 3 which faces radially outwards, twelve excitation electrodes 8 which are essentially square-shaped are disposed equally distributed over the circumference of the hollow cylinder, wherein respectively adjacent excitation electrodes are separated from one another by a separation gap 9 and thereby electrically isolated from one another. The excitation electrodes 8 which are hatched in FIGS. 1 and 2 are hatched only for illustration or for reasons of clarity, otherwise they are completely identical to the excitation electrodes 8 which are not hatched.

The inner peripheral surface 2 and the outer peripheral surface 3 are connected to one another via two planar end faces 4 and 5 which are disposed opposite to one another. It is conceivable that one of the two end faces or even both end faces is or are not planar, but rather comprises or comprise an inclination. In other words, it is conceivable that—in contrast to the embodiment of an ultrasonic actuator according to the invention which is shown in FIGS. 1 and 2—one or both end faces 4 and 5 is or are not disposed at a right angle to the inner and outer peripheral surfaces 2 and 3.

At each of the two end faces 4 and 5 three friction elements 6 are disposed equally distributed in the form of hemispheres made of $Al_2O_3$ over the circumference, which the same are firmly connected to the piezoceramic material of the ultrasonic actuator. However, it is also conceivable to arrange the friction elements 6 on the end faces via a form-fitting connection, for example by using spherical friction elements which are embedded or inserted into complementary recesses on the end faces.

The ultrasonic actuator comprises a total of six friction elements 6. Each friction element 6 is disposed in the area of a separating gap 9 between adjacent excitation electrodes 8.

In each case between the two friction elements 6 which are adjacent with regard to the circumference of the ultrasonic actuator 1 but located on different end faces 4, 5 two excitation electrodes 8 are disposed. Here, the respective friction elements 6 which are adjacent with regard to the circumference of the ultrasonic actuator 1 and are located on different end faces 4, 5 form an opposing pair 10, as illustrated in FIG. 2.

The distance which exists between the two friction elements 6 of an opposing pair 10 with regard to the circumference of the ultrasonic actuator 1 is identical for all six opposing pairs 10, so that two opposing pairs 10 of friction elements 6 which are adjacent to one another are disposed symmetrically to one another with respect to the circumference.

Both end faces 4 and 5 each comprise a groove-shaped recess 11 in the region of the separating gap 9 between the two excitation electrodes 8 of an opposing pair 10, so that in the present case each of the two end faces 4 and 5 comprises six recesses 11 which are equally distributed over the circumference, wherein the six recesses 11 of the upper end face 4 in FIGS. 1 and 2 are disposed at the same peripheral positions as the six recesses 11 of the lower end face 5 in FIGS. 1 and 2. In other words, the recesses 11 are disposed opposite one another in pairs. All groove-shaped recesses 11 are here disposed essentially perpendicular to the inner peripheral surface 2 and perpendicular to the outer peripheral surface 3.

By this specific arrangement of the friction elements 6 and the excitation electrodes 8 to each other it is achieved that, with an electrical excitation of the ultrasonic actuator 1, i.e. when one or more electrical voltages are applied to the electrodes 7 and 8, the friction elements 6 of both end faces 4 and 5, i.e. all of the friction elements of the ultrasonic actuator 1, perform a simultaneous or synchronous movement, which results in the rotary drive of an element to be driven which is in contact with the friction elements.

The above can be deduced in particular from FIGS. 3a and 3b derive, which each show the hollow cylindrical ultrasonic actuator according to FIGS. 1 and 2 as flat pattern. The form of representation is better suited to show how all of the friction elements 6 which are disposed on the two end faces 4 and 5 move with a suitable electrical control of the ultrasonic actuator according to the invention. The two FIGS. 3a and 3b differ from each other only in the opposing directions of oscillation of the friction elements 6, which result in opposite rotational movements of an element to be driven (not shown in FIGS. 3a and 3b) which are in contact with the friction elements 6. In FIGS. 3a and 3b, the recesses 11 of the ultrasonic actuator according to FIGS. 1 and 2 are not shown in order to keep the representation as simple as possible.

As can be seen from FIG. 3a, with appropriate electrical control of the hatched excitation electrodes 8 of the ultrasonic actuator 1, the three friction elements 6 disposed on the upper end face 4 move oscillating in the same direction and synchronously along an motion path or trajectory which is inclined to the end face 4 and essentially linear, marked by the double arrows shown. At the same time, the three friction elements 6 disposed on the lower end face 5 move oscillating in the same direction and synchronously along an motion path or trajectory which is inclined to the end face 5 and essentially linear, wherein this motion path or the trajectory is disposed essentially opposite to the trajectory of the friction element 6 which is disposed on the end face 4 (also represented by the shown double arrows). In other words, the trajectory of the friction elements which are disposed on the upper end face 4 and the end face 4 form a smaller and a larger angle, and these two angles are essentially identical to the corresponding angles which form the trajectory of the friction elements 6 disposed on the lower end face 5 and the end face 5.

By means of the trajectories of the two shown in FIGS. 3a end faces 4 and 5 disposed friction elements 6 can be a movement of an element to be driven which is in contact with the friction elements 6 (not shown in FIGS. 3a and 3b) can be generated, which a rotational movement counter to the clockwise corresponds. In contrast to this, with the opposite trajectories shown in FIGS. 3b, the trajectories on the two friction elements 6 disposed on end faces 4 and 5—which are generated by suitable electrical control of the excitation electrodes 8 shown hatched in figures By means of the trajectories of the friction elements 6 arranged on the two end faces 4 and 5 shown in FIG. 3a, a movement of an element to be driven (not shown in FIGS. 3a and 3b) which is in contact with the friction elements 6 can be produced, which corresponds to a rotational counterclockwise movement. In contrast to this, with the opposite trajectories of the friction elements 6 arranged on the two end faces 4 and 5 which are shown in FIG. 3b—which are produced by suitable electrical control of the excitation electrodes 8 which are marked in a hatched manner in FIG. 3b—a movement of an element to be driven which is in contact with the friction elements 6, wherein the movement corresponds to a clockwise rotational movement.

Differing from the line-shaped trajectories indicated by double arrows in FIGS. 3a and 3b, those trajectories are also suitable which comprise an elliptical shape or a circular shape.

FIG. 4a shows an embodiment of an ultrasonic actuator 1 according to the invention with only one friction element 6 respectively disposed on the two end faces 4 and 5. In this case the friction elements 6 are disposed diametrically opposite to one another, i.e. in relation to the circumference of the hollow cylinder between the two friction elements there is an angular distance of essentially 180°. The ultrasonic actuator also comprises four identical excitation electrodes 8 which are disposed equally over the outer circumference of the hollow cylinder and are each spaced apart from one another by a separating gap 9. Each of the two end faces 4 and 5 comprises two groove-shaped recesses 11 which are disposed diametrically opposite one another and positioned equally with respect to the circumference of the hollow cylinder.

A further embodiment of an ultrasonic actuator according to the invention is shown in FIG. 4b, in which case, in contrast to the ultrasonic actuator shown in FIG. 4a, respectively two friction elements 6 per end face, which are disposed diametrically opposite each other, are provided. The angular spacing, in relation to the circumference of the hollow cylinder, between friction elements which are adjacent but disposed on different end faces is essentially 90°. On the outer peripheral surface 3 of the ultrasonic actuator 1 a total of eight identical excitation electrodes 8 are disposed. Each of the end faces 3 and 4 comprises four groove-shaped recesses 11 which are equally distributed over the circumference.

FIG. 5 shows a further embodiment of an ultrasonic actuator 1 according to the invention in different views in figures (a) to (d), wherein FIG. 5 (a) shows the ultrasonic actuator in a perspective representation, FIG. 5 (b) shows a plan view of the underside or in the direction towards the end face 5, FIG. 5 (c) shows a side view and FIG. 5 (d) shows a plan view of the upper side or in the direction towards the upper end face 4. In this ultrasonic actuator a different number of friction elements 6 is disposed on the two end faces 4 and 5. Three friction elements 6 are disposed on the upper end face 4 in FIG. 5, which are not evenly distributed over the circumference. In contrast, only two friction elements 6 are disposed on the lower end face 5 in the figure, which are not disposed diametrically opposite, so that here too there is a non-equal distribution of the friction elements 6 over the circumference of the end face 5. This results in a total of four opposing pairs 10 of friction elements 6. Ten identical excitation electrodes 8, each spaced apart from one another, are disposed on the outer peripheral surface 3 of the hollow cylindrical ultrasonic actuator 1.

FIG. 6 illustrates another embodiment of an ultrasonic actuator 1 according to the invention, which, unlike the embodiment shown in FIGS. 1 and 2, comprises excitation electrodes 8 with an octagonal shape. Because of this shape of the excitation electrodes 8, in particular the area of the electromechanical material of the hollow cylindrical ring remains free and uncovered with electrodes, where the oscillation amplitudes of the excited ultrasonic actuator for realization of periodic deformations are comparatively large. An ultrasonic actuator designed in this way requires less electrical energy and can therefore be operated more effectively. In addition to the octagonal shape of the excitation electrodes shown in FIG. 6, other shapes are conceivable in which the end section between two adjacent excitation electrodes which faces the respective end face remains uncovered by electrodes. Round or rounded excitation electrodes or oval excitation electrodes are also suitable for this purpose.

The only further distinguishing feature with regard to the embodiment shown in FIGS. 1 and 2 are the recesses on the end faces 4 and 5 that are missing in the ultrasonic actuator according to FIG. 6.

FIGS. 7 and 8 show in different representations a holding device 12 for an ultrasonic actuator according to the invention, wherein in this case an ultrasonic actuator according to FIGS. 1 and 2 is mounted or inserted in the holding device. The holding device 12 comprises an inner contact element 13, an outer contact element 14 and two holding elements 15 and 16. Here, both the inner and the outer contact element 13 and 14 consist of a plastic and preferably of polyetheretherketone (PEEK), while the two holding elements 15 and 16 consist of a metal having resilient properties and preferably consist of spring steel.

The essentially hollow cylindrical inner contact element 13 contacts with protrusion portions 22, which are equally distributed over the circumference, the inner peripheral surface of the ultrasonic actuator 1 in sections, while the essentially hollow cylindrical outer contact element, which surrounds the ultrasonic actuator on its outer peripheral surface, contacts the outer peripheral surface of the ultrasonic actuator via protrusion portions 23 in sections. The protrusion portions 22 and 23 of the inner and the outer contact element 13 and 14 are in contact with the ultrasonic actuator at points or areas at which oscillation nodes of the ultrasonic actuator which in operation underlies periodic deformation occur.

By means of the protrusion portions 22 and 23 of the inner and outer contact elements 13 and 14, the ultrasonic actuator 1 is already mounted or held in such a way that lateral displacements in the plane of the ultrasonic actuator are largely prevented. In order to additionally secure the ultrasonic actuator against rotational displacement and in particular against axial displacement, the inner contact element 13 and the outer contact element 14 are connected to one another via two identical holding elements 15 and 16 which are disposed parallel to one another. The holding elements 15 and 16 here comprise two essentially circular and concentrically disposed ring sections 17 and 18, and web sections 19 connecting the ring sections 17 and 18 to one another.

The upper holding element 15 in FIG. 7 faces the end face 4 of the ultrasonic actuator or disposed close to the same, while the lower holding element 16 in FIG. 7 faces the end face 5 of the ultrasonic actuator. Both holding elements 15 and 16 are connected to the inner and outer contact elements 13 and 14 by fastening means 21 in the form of screws, wherein the inner ring section 17 is screwed to the inner contact element 13 at several positions which are equally distributed over the circumference, while the outer ring section 18 is screwed with the outer contact element 14 at several positions which are equally distributed over the circumference.

The web sections 19 which connect the inner ring portion 17 and the outer ring portion 18 contact the respectively assigned end face 4 or 5 indirectly via an intermediate element 20 made of a rubber-like material. The intermediate element 20 prevents, on the one hand, direct contact between the holding elements 15 and 16 which are made of metal with the electromechanical material of the ultrasonic actuator, which can lead to a removal of the electromechanical material due to the oscillations of the ultrasonic actuator. On the other hand, by the rubber-like material of the intermediate element 20 a comparatively high coefficient of friction is given with respect to the pairings between intermediate element/web section of the holding element and intermediate element/end face of the ultrasonic actuator, so that the tendency of the ultrasonic actuator for a rotary movement or shift is effectively countered.

The holding element 20 comprises a ring section 201 and several lug sections 202 which are formed integrally with the ring section 201, wherein the lug sections 202 are equally distributed over the circumference of the ring section 201 and are disposed in a radial orientation.

The web sections 19 of the two holding elements 15 and 16 are disposed such that their position essentially coincides with the position of the recesses 11 of the ultrasonic actuator, which cannot be seen in FIG. 7. The width of the web sections 19 is smaller than the width of the recesses 11 here, so that the respective section of the deformable intermediate element 20 is at least partially pressed by the web section 19 into the corresponding recess 11, and the resulting mechanical engagement counteracts a rotational displacement of the ultrasonic actuator in operation in an optimized manner.

The intermediate element 20 also ensures that a sufficient holding force or pressure force over the respective web section 20 in the axial direction, i.e. in the direction of the respective end face of the ultrasonic actuator, can be exerted on the ultrasonic actuator, since a contact between the respective web section 19 and the associated end face 4 or 5 of the ultrasonic actuator 1 via the intermediate element even with low manufacturing tolerances is guaranteed.

FIG. 8 shows the individual components of the arrangement of holding device and the ultrasonic actuator according to FIG. 7 in an exploded view. In particular, from FIG. 8 the integral or one-piece design of the intermediate element 20 with the ring section 201 and the lug sections 202, which are equally distributed over the circumference of the ring section and which extend in the radial direction away from the ring section 201, can be taken.

From FIG. 8, further the protrusion portions 22 of the inner contact element 13 and the protrusion portions 23 of the outer contact element 14 can be taken better. The protrusion portions 22 and 23 are each disposed equally distributed over the circumference, wherein the inner contact element 13 comprises six protrusion portions 22 which are integrally formed with the same and which point radially outwards, while the outer contact element 14 comprises twelve protrusion portions 23 which are integrally formed with the same and which point radially inwards.

FIG. 9 shows an ultrasonic motor with an ultrasonic actuator 1 according to the invention according to FIGS. 1 and 2, which is inserted in a holding device 12 according to the invention according to FIGS. 7 and 8. A friction ring 104 is in contact with each of the friction elements 6 of an end face and is pressed against the associated friction elements 6 via a spring washer 106.

The holding device 12 is connected stationary with the housing 102 of the ultrasonic motor 100, while the spring washer 106 is connected to a portion of the drive shaft 108 of the ultrasonic motor 100. The drive shaft 108 is rotatably mounted with respect to the housing 102 by means of bearing elements 110 in the form of ball bearings.

During the operation of the ultrasonic motor 100, the periodic movements of the friction elements 6 disposed on both end faces of the ultrasonic actuator 1 cause the two friction rings 104 to be driven in the same direction, and this movement is transferred to the same via the fixed connection of the friction rings 104 to the spring washers 106 and the simultaneous fixed connection of the spring washers 106 to the drive shaft 108, so that a rotational drive of the drive shaft 108 occurs.

LIST OF REFERENCE SYMBOLS

1 ultrasonic actuator
2 inner peripheral surface (of the ultrasonic actuator 1)

3 outer peripheral surface (of the ultrasonic actuator 1)
4, 5 end faces (of the ultrasonic actuator 1)
6 friction element
7 common electrode
8 excitation electrode
9 separation gap
10 opposing pair (of friction elements 6)
11 recess (of the ultrasonic actuator 1)
12 holding device
13 inner contact element (of the holding device 12)
14 outer contact element (of the holding device 12)
15, 16 holding elements (of the holding device 12)
17 inner ring section (of the holding elements 15, 16)
18 outer ring section (of the holding elements 15, 16)
19 web section (of the holding elements 15, 16)
20 intermediate element
21 fasteners
22 protruding portion (of the inner contact member 13)
23 protrusion portion (of the outer contact element 14)
100 ultrasonic motor
102 housing (of the ultrasonic motor 100)
104 friction ring (of the ultrasonic motor 100)
106 spring washer (of ultrasonic motor 100)
108 drive shaft (of ultrasonic motor 100)
110 bearing element (of the ultrasonic motor 100)
201 ring section (of the intermediate element 20)
202 lug section (of intermediate element 20)

The invention claimed is:

1. An ultrasonic actuator made of an electromechanical material in the form of a ring or hollow cylinder, the ultrasonic actuator comprising:
an inner peripheral surface which is oriented radially inwards;
an outer peripheral surface which is oriented radially outwards; and
end faces which connect the inner peripheral surface and the outer peripheral surface, wherein at least one friction element is disposed on each of the end faces so that the ultrasonic actuator comprises a total of n friction elements with n 2, and a common electrode is disposed on the inner peripheral surface and 2n excitation electrodes are disposed on the outer peripheral surface;
wherein adjacent excitation electrodes are in each case spaced apart from one another by a separating gap, and each friction element is disposed in a region of a separating gap;
wherein two excitation electrodes are disposed between friction elements which form an opposing pair and which are located adjacent with regard to a circumference of the ultrasonic actuator and on different end faces; and
when the ultrasonic actuator is electrically excited, the friction elements of both end faces simultaneously perform a movement which is suitable for an equidirectional rotary drive of an element to be driven which is in contact with the friction elements.

2. The ultrasonic actuator according to claim 1, wherein a distance between the two friction elements of an opposing pair which exists with regard to the circumference of the ultrasonic actuator is identical for all opposing pairs, so that two opposing pairs of friction elements which are positioned adjacent to one another are disposed symmetrically to one another.

3. The ultrasonic actuator according to claim 1, wherein both end faces, in each case in the region of the separation gap between the two excitation electrodes of one opposing pair, comprise a recess.

4. The ultrasonic actuator according to claim 3, wherein the recesses are distributed equally over the circumference of the ultrasonic actuator.

5. The ultrasonic actuator according to claim 3, wherein the recesses are groove-shaped.

6. The ultrasonic actuator according to claim 5, wherein the groove-shaped recesses comprise substantially a V-shape or a U-shape in cross section.

7. The ultrasonic actuator according to claim 5, wherein the groove-shaped recesses are disposed essentially perpendicular to the inner peripheral surface and perpendicular to the outer peripheral surface.

8. The ultrasonic actuator according to claim 1, wherein the excitation electrodes comprise a shape with more than four corners.

9. The ultrasonic actuator according to claim 8, wherein the excitation electrodes comprise an octagonal shape.

10. An ultrasonic motor with an ultrasonic actuator according to claim 1, and further comprising a holding device, wherein the ultrasonic motor is inserted in the holding device and the holding device comprises an inner contact element, an outer contact element and two holding elements, wherein the inner contact element and the outer contact element are connected to one another by the two holding elements, and the inner contact element is in sections in contact with the inner peripheral surface of the ultrasonic actuator and the outer contact element is in sections in contact with the outer peripheral surface of the ultrasonic actuator, and the holding elements are in contact with the end faces of the ultrasonic actuator and clamp the ultrasonic actuator between themselves.

11. The ultrasonic motor according to claim 10, wherein the holding elements comprise two substantially circular and concentrically arranged ring sections, and the ring sections comprise connecting web sections.

* * * * *